United States Patent Office 2,764,604
Patented Sept. 25, 1956

2,764,604

ACETYLATED HYDROXY DERIVATIVES OF FATTY ACIDS

Jack Rockett, New Haven, Conn., assignor to Arnold, Hoffman & Co., Incorporated, Providence, R. I., a corporation of Rhode Island No Drawing. Application March 23, 1953, Serial No. 344,195

8 Claims. (Cl. 260—405)

The present invention relates to novel fatty acid derivatives and has for its principal object the provision of acetylated hydroxy derivatives of unsaturated fatty acids which are suitable for use as intermediates in the production of plasticizers, wetting agents, dispersants and the like.

Another object of the invention is to provide novel procedures for making the aforementioned acetylated hydroxy derivatives of unsaturated fatty acids.

A further object of the invention is the provision of highly useful esters and hydroxy fatty acids derived from unsaturated fatty acids.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The foregoing objects are accomplished, according to the present invention, by reacting paraformaldehyde with the unsaturated fatty acid in an acid solvent for the reactants, and under anhydrous conditions. Typically suitable acid solvents are formic and acetic acids to which a highly acidic catalyst, e. g., sulfuric acid, boron trifluoride, zinc chloride or stannic chloride, may have been added. In some cases, e. g., where formic acid is used as the solvent, the addition of a catalyst is not necessary since the solvent also exerts the desired catalytic effect. Where, however, the solvent demonstrates no significant catalytic action, as is the case where acetic acid is the solvent, a highly acidic catalyst should preferably be added. The amount of catalyst utilized, e. g., sulfuric acid, can be widely varied to advantage although generally it falls within the range of from 2 to 20% by weight of the fatty acid. A catalyst content of from 5 to 8% by weight of the fatty acid has been found to be particularly desirable in giving maximum yield without significant discoloration of the product.

The procedure herein described is successful with any fatty acid containing one or more double bonds, i. e., any unsaturated aliphatic carboxylic acid. Thus, as typically suitable fatty acids there may be mentioned oleic acid, linoleic acid, linolenic acid and ricinoleic acid. These acids are generally reacted with the paraformaldehyde by adding the former to an acid solution of the paraformaldehyde. The latter is prepared by mixing the paraformaldehyde with the acid solvent and catalyst, e. g., acetic acid and sulfuric acid, and heating this mixture to approximately 105° C. whereupon solids dissolve and a crystal clear solution is formed, from which solids do not precipitate even on cooling although a faint haze may develop in some cases. At a temperature of 72–75° C., addition of the unsaturated fatty acid is begun in a slow thin stream. An exothermic reaction takes place which may quickly bring the reaction temperature to about 85° C. The reaction mixture is cooled to about 72° again and the addition of the fatty acid is continued. After the initial exothermic burst of heat, it is found that the temperature is, thereafter, easily controlled. After the addition of the fatty acid is completed, the reaction mixture is heated gently to maintain a temperature of 65–70° for eight to ten hours.

The isolation of the fatty product thus obtained is performed by conventional procedures, generally by immersion in a large quantity of water to cause the oil to separate. Alternatively the acetic acid or other solvent may be reclaimed by distillation at reduced pressures, such that the distillation temperature does not exceed 65–70° C. This latter procedure results in considerable economy in the cost of the products since the solvent recovered is still anhydrous and may be combined with fresh solvent to serve in succeeding reactions. After thoroughly washing the product oil to remove all traces of acidity, there is obtained a clear, pleasant smelling oil of low iodine number. For example, when using commercial oleic acid (mol. wt. 282) as the unsaturated fatty acid reacted with paraformaldehyde, there is obtained a clear amber colored oil having a molecular weight of about 400, and an iodine number of 4.0. This product solidifies at temperatures slightly below 20–25° C. and, having an acetylated hydroxyl group as part of the body of the molecule gives, when esterified at the carboxyl group, a di-ester which has excellent plasticizing properties for polyvinyl chloride resins.

The fatty acid product derived from oleic acid or other unsaturated fatty acid can be saponified with aqueous base, and thereafter acidified to give the free hydroxy acid which generally is a pale ivory wax of medium hardness. Many potential uses are possible for such a hydroxy fatty acid. For instance, they may be made into esters which, when sulfated by well known procedures, give wetting and dispersing agents of great utility in the textile and paper process industries. In addition, the salts of these hydroxy acids, as for instance that of the lithium salt, are valuable greases.

The quantity of paraformaldehyde used for reaction according to the invention can be widely varied. However, for the most complete reaction, and products possessing lowest iodine numbers, it has been found that a mol ratio of 2.5 to 3 mols of paraformaldehyde to one mol of double bond is preferred, although even one mol of paraformaldehyde per mol of double bond may be used. Thus, if a diolefinic fatty acid is utilized, 5 to 6 molecules of paraformaldehyde would preferably be used, since the fatty acid contains two molecules of double bond per gram molecular weight of fatty acid.

As indicated above, the acetylated derivatives obtained according to the invention can be esterified to give highly desirable products. Such esterification can be carried out in conventional manner with various alcohols, e. g., methyl, butyl, 2-ethyl butyl, 2-ethyl hexyl, and furfuryl alcohols. The oils thereby produced have been found to possess excellent plasticizing properties for polyvinyl chloride resins and the like.

Saponification of the acetyl group of the products obtained by reacting paraformaldehyde with the fatty acid according to the invention produces, upon acidification, hydroxy acids. These are generally pleasant smelling pale ivory waxes of medium hardness, capable of undergoing all the normal reactions known to be possible for compounds containing both a hydroxyl and a carboxyl group.

The invention is further illustrated, but not limited, by the following examples.

*Example 1*

A mixture of 94.8 g. of 95% paraformaldehyde, 240 g. of glacial acetic acid, and 19.2 g. of concentrated sulfuric acid were stirred and heated gently under a reflux condenser. At 100° C. the solution began to clear, and, at 105° C. the solid dissolved completely, giving a crystal clear solution. The solution was now allowed to cool to 72° C. During this cooling the solution remained virtually as clear as it had been at 105° C. At 72° C. addition of 299 g. of commercial oleic acid, iodine No. 90.4, was begun (1.04 moles of double bond). An exothermic evolution of heat brought the temperature up to 84°. When the temperature fell to 75°, addition of the oil was continued and was completed in one-half hour. The reaction mixture was then kept at 65–70° for approximately ten hours.

The reaction mixture was added to a liter of cold water, shaken and separated. After one further washing with cold water, the separated oil was brought to a boil with four successive one liter portions of water, until the separated aqueous layer reached a minimum pH of 5.0. The oil was dried over anhydrous sodium sulfate and filtered. There was obtained 395 g. of a pleasant smelling, clear amber oil, iodine No. 4.4, neutral equivalent 400.7. Controlled saponification showed 62.2 mole percent of acetyl groups present. On standing in a cool atmosphere the oil slowly solidified to a wax.

*Example 2*

The same procedure was used as that described in Example 1, except that, upon completion of the reaction, the acetic acid was recovered by a reduced pressure distillation. At 14 mm. of pressure, acetic acid was distilled until the temperature of the reaction mixture had climbed from 35° to 77° C. A total of 230 g. of acetic acid was thereby recovered. The remaining oil was then washed with water as in Example 1, until all acidity had been removed and the aqueous washings had reached a pH of 5.0.

The oil was now saponified by dissolving it in a solution of 360 g. potassium hydroxide in 2.1 liters of water. The soap solution was heated to 100° C. for one hour and then poured into a solution of 480 cc. of concentrated hydrochloric acid in 1 liter of water. This mixture was allowed to cool and the separated wax was mechanically removed and dried by patting with filter paper. There was obtained 353.0 g. of an ivory colored wax, iodine No. 5.0, neutral equivalent 374.4.

*Example 3*

The fatty acids derived, as in Example 1, were esterified with 2-ethyl hexanol by adding 666.5 g. (1.69 moles) of the fatty acid to 440.1 g. (3.38 moles) of the alcohol and 6.7 g. of concentrated sulfuric acid. In a nitrogen atmosphere the ingredients were heated to 110° for two hours. Thereafter the flask was set up for reduced pressure distillation and, at a pressure of 200 mm., a mixture of excess alcohol and water were distilled. The pressure was gradually reduced until 18 mm. was reached and the temperature of the flask contents reached 125° C. The flask was cooled and 12.0 g. sodium bicarbonate was added to neutralize the catalyst. The flask was heated to 90–95° C. for one hour. Thereafter a reduced pressure was again applied, distilling out the excess alcohol at 132°/2 mm. A total of 248 g. of distillate was obtained. The ester was washed with one liter portions of water until all of the salts had been removed.

The ester, acid No. 0.68, was bleached with 30% hydrogen peroxide to give 835 g. of a clear, amber colored oil, acid No. 1.94, iodine No. 6.3, a 97.7% yield.

*Example 4*

The fatty acids derived, as in Example 1, were saponified by dissolving 348.1 g., 0.877 mole, in a solution of 356 g., 6.35 moles, of potassium hydroxide pellets in 2.2 liters of water. The solution was stirred and heated at a temperature of 98–100° C. for two hours. The soap solution was poured equally into two 4-liter beakers, each containing a solution of 240 cc. of concentrated hydrochloric acid plus 500 cc. of water. The beakers were each heated to a boil and allowed to stand overnight. The separated wax layer was mechanically separated, patted dry with filter paper. It is a pale ivory wax of medium hardness, weight 328.9 g., iodine No. 5.1, neutral equivalent 375.9.

*Example 5*

A mixture of 94.8 g. of 95% paraformaldehyde, 240 g. of glacial acetic acid, and 19.1 g. of concentrated sulfuric acid were heated gently under a reflux condenser to a temperature of 105°. The solution turned clear and was allowed to cool to 74°, at which temperature the addition of 298.5 g. (1.0 mole) of commercial ricinoleic acid (iodine No. 88) was begun. In a few minutes, the evolved heat brought the temperature of the mixture up to 80°. It was allowed to cool to 74° when the addition of fatty acid was begun again. The temperature stayed at 74° as the fatty acid was added. Thereafter, the reaction mixture was kept at 62° for twenty hours.

The product of the reaction was now isolated, as in Example 1, by washing and boiling with one liter portions of fresh water. When the aqueous layer reached a pH of about 4.0, the separated oil was dried over anhydrous sodium sulfate and filtered. There was obtained 359.1 g. of a dark brown oil with a pleasant, slightly pungent odor, iodine No. 14.7, neutral equivalent 555.1. Saponification showed the material to contain 141.4 mole percent of acetyl groups.

*Example 6*

A mixture of 94.8 g. of 95% paraformaldehyde, 240 g. of glacial acetic acid, and 19.1 g. of concentrated sulfuric acid were heated to effect solution, as in Example 1. The solution was allowed to cool to 50° C., at which time the formaldehyde began to cloud out of solution. The addition of 165.9 g. of technical linoleic acid (Iodine No. 153), containing 1.0 mole of double bond was begun. The temperature of the reaction mixture rose to 57°. It was allowed to cool to 52° C. before the addition of fatty acid was continued. The temperature of the reaction mixture remained between 50–54° for the remainder of the addition. Thereafter the flask contents were kept at 59° for seventeen hours.

The product of the reaction was isolated, as in Example 5, by washing and boiling with fresh portions of water until the pH of the aqueous washings reached 4.0. The product was dissolved in ethyl ether, dried over anhydrous sodium sulfate, and filtered. After removal of the ether there was obtained 225.8 g. of a dark brown wax, iodine No. 6.5, neutral equivalent 467.6.

*Example 7*

A mixture of 92.9 g. of 98% formic acid and 17.4 g. of 95% paraformaldehyde were stirred and heated to a temperature of 70° C. The mixture was then cooled to 43° C., at which time 149.6 g. (0.5 mole double bond) of commercial oleic acid was added dropwise. The temperature rose to 58°. When all of the fatty acid had been added, the solution was heated at 55° for five hours longer. The product was then washed with water until the pH of aqueous washings reached 5.0. There was obtained 143.1 g. of a pale yellow oil, iodine Number 75.1, neutral equivalent 332.0. Saponification showed the material to contain 27.2 mole percent of formyl groups.

Having thus described my invention, what I claim is:

1. A process for the production of acylated derivatives of hydroxyl aliphatic acids which comprises reacting a relatively long chain unsaturated fatty acid containing up to 18 carbon atoms with from 1 to 3 mols of paraformaldehyde per mol equivalent of double bond under substantially anhydrous conditions and in a solution of a lower aliphatic monocarboxylic acid.

2. The process of claim 1, wherein said reaction is carried out in the presence of a highly acidic catalyst selected from the group consisting of Friedel-Crafts and Lewis acid type catalysts.

3. The process of claim 2 wherein said catalyst is selected from the group consisting of sulphuric acid, boron trifluoride, zinc chloride and stannic chloride and is used in an amount between 2 and 20% by weight of said fatty acid.

4. The process of claim 1 wherein said monocarboxylic acid is selected from the group consisting of formic and acetic acids.

5. The process of claim 1, wherein the solvent is acetic acid containing a highly acidic catalyst selected from the group consisting of Friedel-Crafts and Lewis acid type catalysts.

6. The process of claim 1 wherein said fatty acid is selected from the group consisting of oleic, linoleic, linolenic and ricinoleic acids.

7. The process of claim 1, wherein said fatty acid is oleic acid.

8. The process of claim 1, wherein the fatty acid is selected from the group consisting of oleic, linoleic, linolenic and ricinoleic acids, the monocarboxylic acid is selected from the group consisting of formic and acetic acids, and there is present a highly acidic catalyst selected from the group consisting of sulphuric acid, boron trifluoride, zinc chloride and stannic chloride, used in an amount between 2 and 20% by weight of said fatty acid.

References Cited in the file of this patent

UNITED STATES PATENTS

| | | |
|---|---|---|
| 772,129 | Burton | Oct. 11, 1904 |
| 988,032 | Rossner | Mar. 28, 1911 |
| 1,927,296 | Powers | Sept. 19, 1933 |
| 2,109,573 | Marks | Mar. 1, 1938 |
| 2,375,537 | De Groote | May 8, 1945 |
| 2,406,206 | De Groote et al. | Aug. 20, 1946 |
| 2,435,773 | Clifford et al. | Feb. 10, 1948 |
| 2,443,409 | Whitner | June 15, 1948 |
| 2,578,647 | Stiteler et al. | Dec. 11, 1951 |
| 2,652,411 | Teeter et al. | Sept. 15, 1953 |